Figure 1:
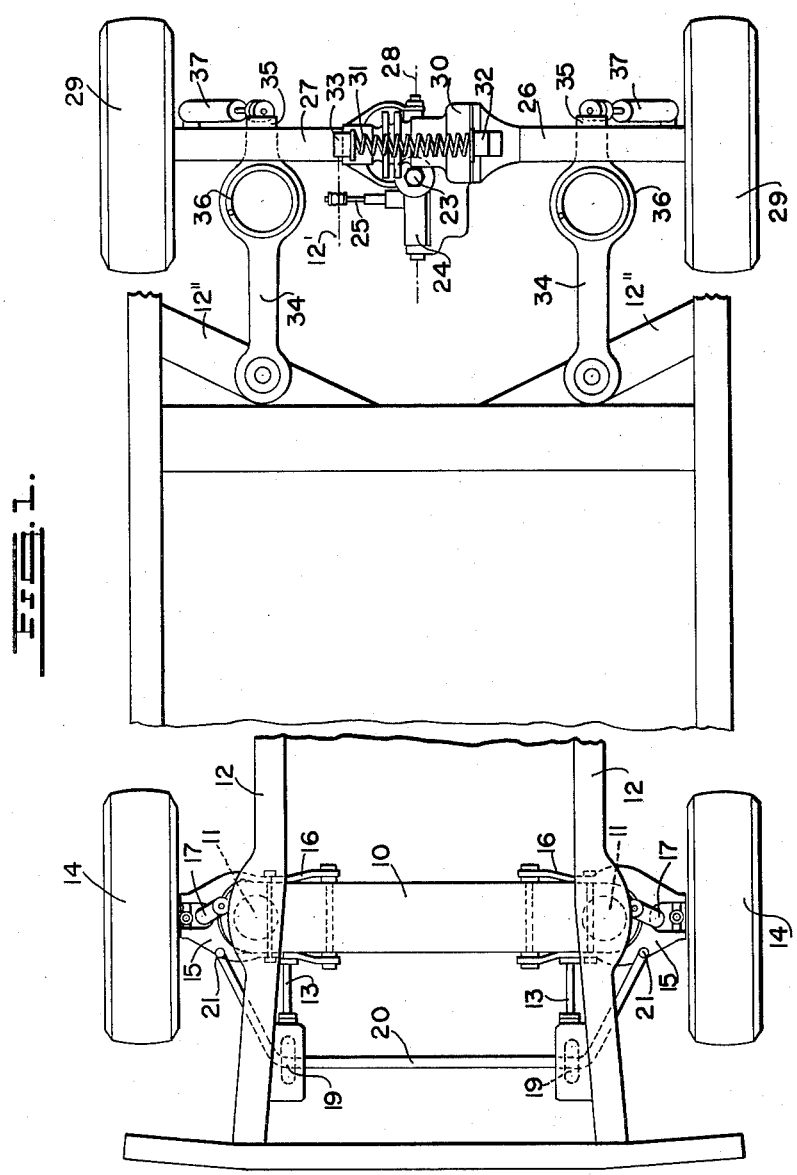

Sept. 3, 1963 R. E. UHLENHAUT ETAL 3,102,736
WHEEL SUSPENSION SYSTEM
Filed June 15, 1959 2 Sheets-Sheet 1

INVENTORS
RUDOLF E. UHLENHAUT
JOSEF MÜLLER
ALFRED FR. ROTHWEILER
BY Dicke, Craig and Freudenberg
ATTORNEYS Sept. 3, 1963 R. E. UHLENHAUT ETAL 3,102,736
WHEEL SUSPENSION SYSTEM
Filed June 15, 1959 2 Sheets-Sheet 2

INVENTORS
RUDOLF E. UHLENHAUT
JOSEF MÜLLER
ALFRED FR. ROTHWEILER
BY Dickey, Craig and Freudenberg
ATTORNEYS

United States Patent Office 3,102,736
Patented Sept. 3, 1963

3,102,736
WHEEL SUSPENSION SYSTEM
Rudolf E. Uhlenhaut, Stuttgart, Josef Mueller, Stuttgart-Riedenberg, and Alfred Fr. Rothweiler, Esslingen-Hegensberg, Germany, assignors to Daimler-Benz Aktiengesellschaft, Stuttgart-Unterturkheim, Germany
Filed June 15, 1959, Ser. No. 820,253
Claims priority, application Germany June 24, 1958
16 Claims. (Cl. 280—124)

The present invention relates to a wheel suspension for vehicles, and more particularly to a wheel suspension system for motor vehicles including the combined features, on the one hand, of a wheel suspension for the front wheels of the vehicle by means of double superposed transverse guide members which have such a position that the instantaneous center for the swinging movements of the vehicle superstructure, such as the frame or body about a longitudinal vehicle axis is disposed at a distance above the road surface which is larger than one third of the height of the wheel centers above the road surface, however, which is smaller than the height of the wheel centers, and which amounts in particular with passenger motor vehicles to a distance of 100 to 200 mm. over the road surface and, on the other, a rear wheel suspension by means of swinging half axles.

The swinging half axles used as rear axles for motor vehicles which offer favrabloe characteristics in many situations and under varied conditions entail a relatively high instantaneous center for the swinging movements of the vehicle superstructure about a longitudinal vehicle axis. The instantaneous center within the region of the rear axle thereby coincides, when both swinging half axles pivot or swing about one and the same axis of rotation, with this axis of rotation while otherwise the instantaneous center may even be disposed higher. The instantaneous center within the region of the front axles, in contrast thereto, is disposed with the usual wheel suspensions having double arm transverse guide members in the road surface or only at a slight distance thereabove. The line connecting the two instantaneous centers of the rear axle and the front axle is, therefore, strongly inclined in a downward direction from the rear towards the front. The vehicle superstructure such as the body or frame pivots or tilts about this connecting line which might be designated as transverse tilting axis if lateral forces, such as, for example, the centrifugal force, act thereagainst. The rolling moment about the transverse tilting axis exerted by the centrifugal force on the vehicle has to be absorbed by the moments which become effective as different wheel-loads of the right and left wheel of the front axle and of the rear axle system. The distribution of this difference in the wheel loads on the front axle and rear axle is far-reachingly dependent on the position of the transverse tilting axis. In the usual position thereof, as mentioned hereinabove, a greater portion of the wheel-load difference falls on the rear axle than on the front axle. Consequently, these types of vehicles tend readily toward oversteering.

The present invention discloses simple means to reduce this tendency of oversteering. This is achieved in accordance with the present invention by arranging the front axle suspension in such a way that the instantaneous center of the front axle is relatively high so that with an average loading of the motor vehicle, for example, in a passenger motor vehicle having five seats, with a load of three persons, the intantaneous center comes to lie in the upper two-thirds of the height of the wheel center above the road surface, especially with passenger motor vehicles at a distance of 100 to 200 mm. about the road surface. In this manner, the wheel-load difference of the front wheels is increased while passing through curves and therewith the tendency toward oversteering is reduced. It should be noted, however, that the instantaneous center of the front axle system cannot be arranged too high because otherwise changes in the wheel tread of the wheels during spring movements thereof would become excessively large.

Additionally, the swinging half axles may be connected with each other by an equalization spring system. As a result thereof, the rear axle spring system becomes very soft when tilting while driving through a curve and thereby absorbs less of the wheel-load difference. The wheel-load difference at the front wheels has to increase correspondingly by a proportionate amount which again results in a reduction of the tendency toward oversteering.

An arrangement according to which the instantaneous center of the rear axle is lowered also becomes effective in the same manner. Consequently, it is proposed according to a further feature of the present invention that both swinging half axles are arranged to pivot about one and the same axis of rotation which is disposed lower than the wheel centers.

The more of the wheel-load difference is absorbed by the front wheels, the larger the forces the usual torsion road stabilizer has to transmit. In order that these larger forces are transmitted in a favorable manner and are adapted to be absorbed in an advantageous manner, the present invention proposes to arrange the point of connection thereof in direct proximity of the wheel along the lower cross guide member thereof.

As already mentioned hereinabove, arranging the instantaneous center of the front axle relatively higher results in an arrangement in which a certain amount of change in the wheel tread results during spring movements of the wheels. Consequently, while passing road obstacles, the wheel has to undergo both a spring stroke and lateral movement. It is known that an independently suspended wheel is less likely to carry out these composite movements than a wheel which only has to undergo vertical spring movements. As a result thereof, under certain driving conditions, relatively somewhat stronger rattling and shaking movements are likely to be transmitted thereby to the vehicle. Consequently, according to another feature of the present invention, it is proposed to arrange the shock absorbers in direct proximity to the wheel resulting in the smallest possible shock absorber forces with given wheel forces, and to undertake the suspension of the wheels at an auxiliary frame which is elastically secured at the vehicle main frame or at the self-supporting vehicle body thereof.

Accordingly, it is an object of the present invention to provide a wheel suspension for a motor vehicle which permits independent wheel suspensions for all the wheels while at the same time enabling favorable spring characteristics for the various suspensions.

It is another object of the present invention to provide a wheel suspension for motor vehicles permitting independent wheel suspensions for all the wheels thereof which reduces the tendency of oversteering produced by the use of swinging half axles in connection with the rear wheels.

A further object of the present invention is the provision of a wheel suspension which reduces the downward slope from the rear to the front of the tilting axis formed by the line interconnecting the instantaneous centers of the rear and front axle suspension systems.

Another object of the present invention resides in the provision of an all-independent wheel suspension system in which the transmission of vibrations and shocks emanating from the wheels to the vehicle superstructure such as the frame or vehicle body is minimized as much as possible.

Figure 2:
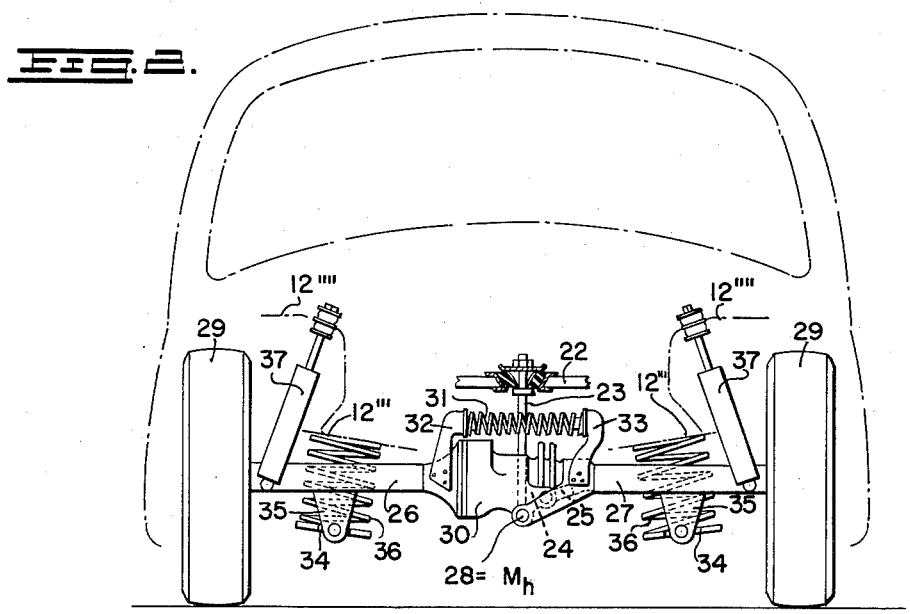
Figure 3:
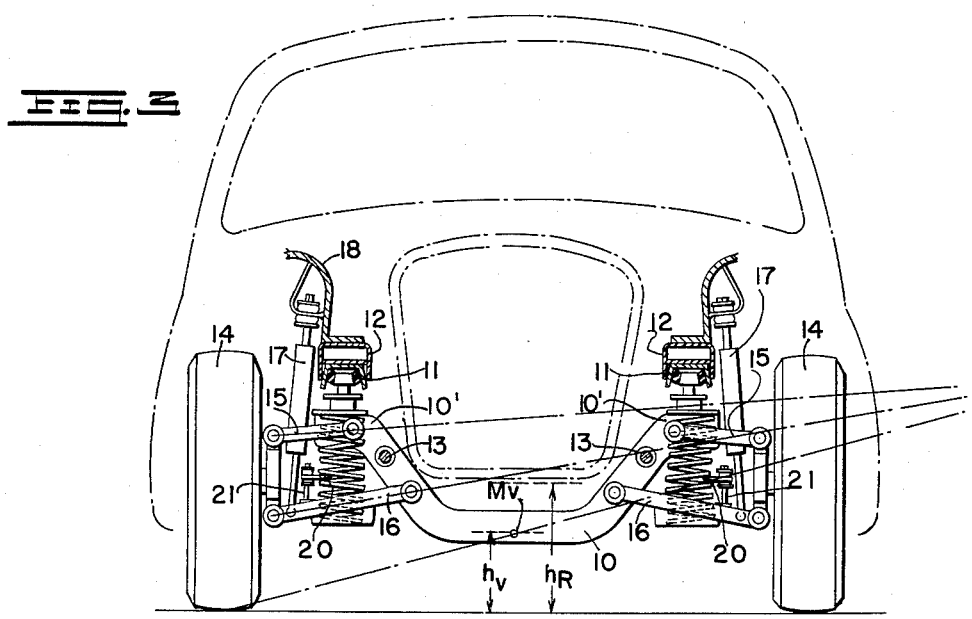
Figure 4:
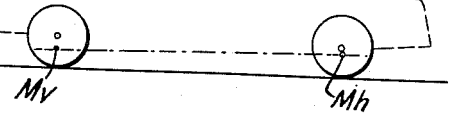

These and other objects, features and advantages of the present invention will become more obvious from the following description when taken in connection with the accompanying drawing which shows, for purposes of illustration only, one embodiment in accordance with the present invention, and wherein:

FIGURE 1 is a top plan view of a motor vehicle frame and wheel suspension according to the present invention, FIGURE 2 is a rear elevational view of the rear axle suspension of FIGURE 1, FIGURE 3 is a front elevational view of the front axle suspension in accordance with the present invention, and FIGURE 4 is a schematic side elevational view of a motor vehicle in accordance with the present invention and illustrating the longitudinal axis passing through the instantaneous centers of swinging movements of the front and rear wheel suspension thereof.

Referring now to the drawing which shows a motor vehicle loaded by an average load, for example, a five passenger vehicle loaded by three persons and in which the steering and brake installations as well as the drive arrangement are omitted for the sake of clarity while like reference numerals are used throughout the various views to designate like parts, reference numeral 10 designates the transverse front axle member which is elastically secured in the rubber bearings 11 at the longitudinal bearer members 12 of the vehicle frame. The rubber bearings 11 are relatively soft as regards vertical movements of the front axle member 10, however, are relatively stiff with respect to horizontal movements thereof. The front axle member 10 is supported at the frame by means of guide members 13 supported in rubber bearings in order to prevent tilting of the front axle member 10 about a vehicle transverse axis.

Each of the front wheels 14 is suspended at the front axle member 10 by means of fork-shaped transverse guide members 15 and 16. The inclination of the transverse guide members 15 and 16 is so selected that the instantaneous center $M_v$ for swinging movements of the vehicle superstructure about a vehicle longitudinal axis, referred to herein as rolling movements, has a height $h_v$ (FIGURE 3) above the road surface which is disposed within the region of the upper two-thirds of the height $h_R$ of the wheel centers above the road surface. Coil springs are interposed in the usual manner between the transverse guide members 16 and the upwardly bent end portions 10′ of the front axle member 10. Shock absorbers 17 are pivotally secured at the lower guide members 16 directly in proximity to the wheels and at the sheet metal members 18 of the body forming the wheel housings. The torsion rod stabilizer 20 supported at 19 in the frame of the vehicle acts on or is operatively connected with the lower transverse guide members 16 by means of vertical link members 21 also disposed in proximity to the wheels.

The rear axle member 24 (FIGURE 2) is suspended in rubber by means of a rod-like bearer arm 23 at the frame cross bearer member 22. The rear axle member 24 is thereby supported against swinging movements about a vehicle longitudinal axis by a support member 25 at the frame part schematically illustrated and designated by reference numeral 12′ (FIGURE 1).

The rear axle tubular members 26 and 27 of the swinging half axle arrangement are pivotally secured within one and the same axis of rotation 28 at the rear axle support member 24. The axis of rotation 28 is disposed lower than the wheel centers for the wheels 29 and represents also the instantaneous center $M_h$ (FIGURE 2) for the swinging movements of the vehicle superstructure about a vehicle longitudinal axis within the area of the rear axle. The transverse tilting axis of the vehicle would result from a straight line forming a longitudinal vehicle axis and connecting the two instantaneous centers $M_v$ and $M_h$. The differential gear housing 30 is rigidly connected with the left rear axle tubular member 26 and pivots together with the latter about the axis of rotation 28.

An equalization coil spring 31 extends between two arms 32 and 33 which are rigidly connected in any suitable manner with the two tubular members 26 and 27. Thrust rods 34 are secured by means of appropriate rubber bearings, on the one hand, at brackets 35 of the tubular members 26 and 27 and, on the other, at the frame parts 12″. The usual coil springs 36 for spring supporting the tubular members 26 and 27 at the frame, indicated by reference numeral 12‴ in FIGURE 2 also abut against the thrust rods 34. Shock absorbers 37 are interposed between the tubular axle members 26 and 27 and the frame parts 12⁗.

Motor vehicles are known which utilize independent wheel suspensions for the front and rear wheels, and more particularly which utilize double transverse guide links for the front wheels and swinging half axles for the rear wheels. However, such a combination of wheel suspensions entail the disadvantage of the tendency of so-called "over-steering." The term "over-steering" usually is used to designate the behavior of a vehicle which when driving through a curve, particularly a sharp curve, actually describes a sharper curve than corresponds to the geometry of the steering deflection of the front wheels.

The over-steering tendency of a motor vehicle takes place when the absolute amount of the wheel load difference of the rear wheels is larger than the absolute amount of the wheel load difference of the front wheels while driving through a curve. On the other hand, under steering takes place when the absolute amount of the wheel load difference of the front wheels is larger than the absolute amount of the wheel load difference of the rear wheels when driving through a curve.

Underlying the present invention is a simple solution to prevent this "over-steering" in vehicles having independent front and rear wheel suspensions of the type mentioned hereinabove while simultaneously maintaining the basic concept of the vehicle and without the danger of "under steering."

It can be readily demonstrated by theoretical explanations and calculations that a motor vehicle having independent front and rear wheels suspensions consisting of double transverse guide links in front and swinging half axles in the rear have a tendency of "over-steering" since the absolute amount of the wheel load difference, when driving through curves, is larger in the rear than in the front thereof.

It is also noted that the vehicle undergoes its rolling movements, for example, as a result of centrifugal forces, about an axis passing through the instantaneous centers of the front axle and rear axle. This axis therefore constitutes that geometrical axis about which the vehicle body tilts or rotates in case of lateral forces acting thereagainst. While the centrifugal force is normally thought of as acting through the center of gravity, a corresponding force and counter force may be thought of as also acting at the longitudinal rolling axis which passes through both instantaneous centers. However, any corresponding force acting at the longitudinal rolling axis is distributed to the front and rear axles in a manner corersponding to the distance of the two axles from the center of gravity. These forces then produce rolling moments at the axles which have to be absorbed by moments of the wheel load differences. Even though these forces may be approximately the same at the front and rear axles, the absolute amount of the wheel load difference at the rear axle is larger than at the front axle since the vertical distance of the instantaneous center of the rear axle from the road surface is greater than the vertical distance of the instantaneous center of the front axle from the road surface.

In modern passenger motor vehicle designs having double cross link guide arms for the front suspension and swinging half axles for the rear suspension, the rear axle spring system, as a rule, is stiffer than the spring system for the front axle. This design trend is due to the fact that any changes in the passenger vehicle occur for the most part at the rear axle. In order to prevent excessive changes in the road clearance, the rear axle spring system has to be constructed therefore in a relatively stiff manner. Additionally, when driving over a road obstacle, it is desirable that the vehicle performs spring movements as parallel as possible and with as little as possible nodding or nose-diving. Since the road obstruction reaches the rear axle later than the front axle, care must be taken that the swinging movements of the rear axle catch up with the swinging movements of the front axle. Consequently, the rear axle must undergo more rapid swinging movements, all of which points toward a stiffer spring characteristic for the rear axle spring system. However, by reason of the stiffer rear axle spring characteristics, a larger proportion of the moment is absorbed by the rear axle than by the front axle. As a result thereof, there occurs in the prior art constructions of vehicles of the type mentioned hereinabove again a larger wheel load difference in the rear than in the front, thereby further aggravating the disadvantageous conditions mentioned hereinabove which produce the over-steering.

Based on the aforementioned analysis, the present invention provides means to equalize the wheel load differences in front and in the rear so as to obtain as neutral as possible a steering behavior of the vehicle, i.e., one which neither offers over-steering nor under-steering.

To achieve this, the instantaneous center of the front axle is raised, i.e., the distance $h_v$ is increased as the moments at the front and rear axle are thereby somewhat matched to each other. On the other hand, the increase in the distance $h_v$ is limited as otherwise excessive changes in the track and camber occur during spring movements of the vehicle wheel. The limitations mentioned hereinabove for the distance $h_v$ therefore represent limitations beyond which the detrimental secondary effects result therefrom which jeopardize the advantages gained for purposes of controlling the over-steering. Furthermore, these limitations in the distance $h_v$ can be readily maintained since the present invention provides a second remedial means for reducing the wheel load difference which second remedial means may be used at the same time as and in conjunction with the first remedial means constituted by the raising of the instantaneous center $M_v$. This second remedial means resides in the provision of an equalization spring for the swinging half axles of the rear suspension.

Whereas equalization springs have been used heretofore with swinging half axles to prevent excessive tilting of the vehicle body when the vehicle drives over one-sided road obstructions, the present invention utilizes such equalization spring system because in case of deflections of both rear wheels in the same direction the equalization spring is relatively stiff whereas with oppositely directed deflections of the wheels it becomes very soft and is completely ineffectual with identical oppositely directed deflections. In other words, the use of equalization springs in the prior art was predicated on the operating characteristics that when one wheel passes over a road obstsuction, i.e., moves against the vehicle body, the other wheel, as a result of the connection provided by the equalization spring, has a tendency to move away from the vehicle body which causes lifting of the vehicle body on the side on which no road obstruction is located whereby the vehicle body is lifted on both sides and strong tilting thereof is avoided. In the present invention, the equalization spring system is utilized because of the fact that it offers soft spring characteristics, possibly no spring effect in case of oppositely directed deflections of the wheels as occur during curve tilting of the vehicle body against the frame, for example, as a result of centrifugal forces while driving through curves. Consequently, the equalization spring according to the present invention is utilized as means to cause absorption of as much as possible of the moment by the front axle and therewith to reduce the wheel load difference at the rear axle in order to achieve a neutral steering characteristic of the vehicle without having to locate the instantaneous center of the front axle excessively high above the road surface.

Since a stabilizer between the front wheels increases the resistance during tilting of the vehicle body about the rolling axis, a larger portion of the moment is also absorbed by the existence of such a stabilizer which again means that the wheel load difference at the front axle becomes effectively greater in relation to the wheel load difference at the rear axle, thereby acting in the sense of the desired decrease of the tendency of over-steering.

While we have shown and described one embodiment in accordance with the present invention it is understood that the same is not limited thereto but is susceptible of many changes and modifications within the spirit and scope of the present invention and, we, therefore, do not wish to be limited to the details described and illustrated herein but intend to cover all such changes and modifications as are encompassed by the scope of the appended claims.

What is claimed is:

1. A wheel suspension system for a motor vehicle having a vehicle superstructure and front and rear wheels, in which oversteering is effectively prevented, comprising independent front wheel suspension means for independently suspending each front wheel from said vehicle superstructure to provide an instantaneous center for the swinging movements of said vehicle superstructure about a longitudinal vehicle axis, said center being disposed approximately at a distance above the road surface which is greater than essentially one-third of the height of the wheel centers of the front wheels from the road surface and smaller than essentially the height of the wheel centers from the road surface, independent rear wheel suspension means for independently suspending the rear wheels from said vehicle superstructure including swinging half-axles, and equalizing spring means operatively interposed only between said swinging half-axles and operatively connecting said swinging half-axles with each other to effectively provide relatively soft spring characteristics for oppositely directed spring deflections of the rear wheels and relatively stiff spring characteristics for one-sided deflections of the rear wheels.

2. A wheel suspension for a motor vehicle according to claim 1, further comprising torsion rod stabilizer means operatively connecting said front wheels.

3. A wheel suspension for a motor vehicle according to claim 1, wherein said independent front wheel suspension means includes upper and lower transverse guide members further comprising torsion rod stabilizer means operatively connecting said front wheels, and wherein said torsion rod stabilizer means is operatively connected with the lower transverse guide members in direct proximity to the respective wheels.

4. A wheel suspension for a motor vehicle according to claim 3, further comprising shock absorber means operatively connecting said front wheel suspension means directly with said vehicle superstructure, said shock absorber means being secured to the lower transverse guide members in direct proximity to the respective wheel.

5. A wheel suspension for a motor vehicle according to claim 1, wherein said independent front wheel suspension means includes upper and lower transverse guide members further comprising auxiliary frame means, means for elastically supporting said auxiliary frame means at said vehicle superstructure, said transverse guide members being operatively connected with said auxiliary frame means, shock absorber means, said vehicle superstructure including a wheel housing for each of the front wheels, and wherein said shock absorber means are operatively connected, on the one hand, with a respective wheel housing, and, on the other, with a respective lower transverse guide member in direct proximity to the corresponding wheel to thereby directly connect said lower transverse guide members with said vehicle superstructure in by-passing relationship to said auxiliary frame means.

6. A wheel suspension for a motor vehicle according to claim 1, wherein said independent front wheel suspension means includes upper and lower transverse guide members further comprising auxiliary frame means, means for elastically supporting said auxiliary frame means at said vehicle superstructure, said transverse guide members being operatively connected with said auxiliary frame means.

7. A wheel suspension system for a motor vehicle having a vehicle superstructure and front and rear wheels, in which oversteering is effectively prevented, comprising independent front wheel suspension means independently suspending each front wheel from said vehicle superstructure to provide an instantaneous center for swinging movements of said vehicle superstructure about a longitudinal vehicle axis which is disposed approximately at the distance above the road surface which is greater than essentially one-third of the height of the wheel centers of the front wheels from the road surface and smaller than essentially the height of the wheel centers from the road surface, independent rear wheel suspension means for independently suspending the rear wheels from said vehicle superstructure including swinging half-axles, and equalizing spring means operatively connecting said swinging half-axles with each other, said swinging half-axles pivoting about one and the same axis of rotation which is disposed lower than the wheel centers.

8. A wheel suspension system for a motor vehicle according to claim 7, further comprising torsion rod stabilizer means operatively connecting said front wheels.

9. A wheel suspension for a motor vehicle according to claim 7, wherein the transverse tilting axis of the vehicle formed by said longitudinal axis passes through the instantaneous centers of the front and rear wheel suspension means and slope from the rear to the front of the vehicle.

10. A wheel suspension for a motor vehicle according to claim 7, wherein said equalizing spring means consists of a coil spring disposed essentially in the transverse direction of the vehicle, and abutment means at each half axle against which said coil spring abuts.

11. A wheel suspension for a motor vehicle according to claim 7, wherein said independent front wheel suspension means includes auxiliary frame means, and means for elastically supporting said auxiliary frame means at said vehicle superstructure, said front wheels being suspended from said auxiliary frame means.

12. A wheel suspension for a motor vehicle having a vehicle superstructure and front and rear wheels, in which oversteering is effectively prevented, comprising independent wheel suspension means for independently suspending each front wheel from said vehicle superstructure to provide an instantaneous center for swinging movement of said vehicle superstructure about a longitudinal vehicle axis which is disposed approximately at the distance above the road surface which is greater than essentially one-third of the height of the wheel centers of the front wheels from the road surface and smaller than essentially the height of the wheel centers from the road surface, and independent rear wheel suspension means for independently suspending the rear wheels from said vehicle superstructure including swinging half-axles, said swinging half-axles pivoting about one and the same axis of rotation which is disposed lower than the wheel centers.

13. A wheel suspension system for a motor vehicle according to claim 12, further comprising torsion rod stabilizer means operatively connecting said front wheels.

14. A wheel suspension for a motor vehicle having a vehicle superstructure and front and rear wheels and which effectively prevents over-steering, comprising independent front wheel suspension means for independently suspending each front wheel from said vehicle superstructure including double transverse guide members for each front wheel having such a position that the instantaneous center for the swinging movements of said vehicle superstructure about a longitudinal vehicle axis is disposed approximately at a distance above the road surface which is greater than essentially one-third of the height of the wheel centers of the front wheels from the road surface and smaller than essentially the height of the wheel centers from the road surface, and independent suspension means for independently suspending the rear wheels relatively soft in case of oppositely directed forces from said vehicle superstructure including swinging half-axles, auxiliary frame means, means for elastically supporting said auxiliary frame means at said vehicle superstructure, said transverse guide members being operatively connected with said auxiliary frame means, and said means for elastically supporting said auxiliary frame means at said vehicle superstructure including elastic bearings which are relatively yielding in the vertical direction and relatively unyielding in the lateral and longitudinal directions of the vehicle, and a plurality of longitudinally extending guide members arranged at a level below that of said elastic bearings.

15. A wheel suspension for a motor vehicle according to claim 14, wherein said elastic bearings are ararnged essentially in a vertical transverse plane extending through the centers of the front wheels.

16. A wheel suspension for a motor vehicle according to claim 15, wherein said guide members extend in the forward longitudinal direction of the vehicle.

References Cited in the file of this patent

UNITED STATES PATENTS

| | | |
|---|---|---|
| 1,773,318 | Raab | Aug. 19, 1930 |
| 2,085,006 | Coleman | June 29, 1937 |
| 2,092,612 | Olley | Sept. 7, 1937 |
| 2,555,141 | Leighton | May 29, 1951 |
| 2,696,388 | Kishline et al. | Dec. 7, 1954 |
| 2,739,658 | Kolbe | Mar. 27, 1956 |
| 2,751,992 | Nallinger | June 26, 1956 |
| 2,753,190 | Hooven | July 3, 1956 |
| 2,806,714 | Scherenberg et al. | Sept. 17, 1957 |
| 2,856,198 | Muller | Oct. 14, 1958 |
| 2,968,492 | Nallinger | Jan. 17, 1961 |
| 3,003,575 | Nallinger | Oct. 10, 1961 |

FOREIGN PATENTS

| | | |
|---|---|---|
| 178,394 | Switzerland | Sept. 17, 1935 |
| 763,907 | France | Feb. 19, 1934 |